US011282341B2

(12) United States Patent
Simon et al.

(10) Patent No.: US 11,282,341 B2
(45) Date of Patent: Mar. 22, 2022

(54) LIVE-EVENT BETTING SYSTEM HAVING STRATEGIC BETS PLACED BY THE HOUSE

(71) Applicants: Burton Simon, Silverthorne, CO (US); Tracy Ericson, Collinsville, CT (US)

(72) Inventors: Burton Simon, Silverthorne, CO (US); Tracy Ericson, Collinsville, CT (US)

(*) Notice: Subject to any disclaimer, the term of this patent is extended or adjusted under 35 U.S.C. 154(b) by 0 days.

(21) Appl. No.: 16/380,874

(22) Filed: Apr. 10, 2019

(65) Prior Publication Data

US 2019/0251794 A1     Aug. 15, 2019

Related U.S. Application Data

(63) Continuation-in-part of application No. 15/621,927, filed on Jun. 13, 2017, now abandoned.

(51) Int. Cl.
| | | |
|---|---|---|
| *G07F 17/32* | (2006.01) | |
| *G06Q 50/34* | (2012.01) | |
| *G06F 17/18* | (2006.01) | |
| *G06N 20/00* | (2019.01) | |

(52) U.S. Cl.
CPC .......... *G07F 17/3288* (2013.01); *G06F 17/18* (2013.01); *G06Q 50/34* (2013.01); *G07F 17/3244* (2013.01); *G06N 20/00* (2019.01); *G07F 17/32* (2013.01)

(58) Field of Classification Search
CPC .................................................. G07F 17/3288
See application file for complete search history.

(56) References Cited

U.S. PATENT DOCUMENTS

| | | | | |
|---|---|---|---|---|
| 7,351,149 B1* | 4/2008 | Simon | .................... | G06Q 50/34 463/25 |
| 7,740,539 B2* | 6/2010 | Simon | .................... | G06Q 50/34 463/16 |
| 2003/0157976 A1 | 8/2003 | Simon et al. | | |
| 2005/0215313 A1* | 9/2005 | O'Halloran | ......... | G07F 17/3258 463/26 |
| 2005/0227757 A1* | 10/2005 | Simon | .................... | G07F 17/32 463/25 |

(Continued)

OTHER PUBLICATIONS

WO 2007/118300 A1 (Year: 2007).*

*Primary Examiner* — Seng H Lim
(74) *Attorney, Agent, or Firm* — Leydig, Voit & Mayer, Ltd.

(57) ABSTRACT

An in-progress sports betting system able to provide improved estimated payoff odds for non-fixed-odds betting, where the house places bets along with players. The system includes an intelligent subsystem (AI) designed to estimate real-time probabilities of outcomes associated with live events, and a host computer able to accept bets from players, place bets on behalf of the house based on the real-time probability estimates, maintain a detailed electronic record on all betting activity (including house betting activity), continuously estimate and post payoff odds for the players based on the electronic record, and distribute payoffs on wining bets when the betting events terminate. The purpose of the house bets is to continuously and strategically adjust the real-time posted payoff odds and to create additional revenue for the house. Players can communicate with the host computer and place bets through physical devices, such as mobile electronic devices, personal computers, or stationary kiosks.

11 Claims, 6 Drawing Sheets

(56) References Cited

U.S. PATENT DOCUMENTS

| | | |
|---|---|---|
| 2006/0052158 A1* | 3/2006 | Raniere ............... G07F 17/3288 463/25 |
| 2011/0207524 A1* | 8/2011 | Simon ................. G07F 17/3288 463/25 |
| 2012/0214575 A1 | 8/2012 | Amaitis et al. |
| 2017/0132875 A1* | 5/2017 | Freedman ........... G07F 17/3209 |
| 2018/0047250 A1 | 2/2018 | Asher et al. |
| 2019/0392684 A1* | 12/2019 | McDonald .......... G07F 17/3288 |

* cited by examiner

LIVE-EVENT BETTING SYSTEM HAVING STRATEGIC BETS PLACED BY THE HOUSE

CROSS-REFERENCE TO RELATED APPLICATIONS

This application is a continuation-in-part and claims priority from U.S. patent application Ser. No. 15/621,927, filed Jun. 13, 2017, which is incorporated by reference herein to the extent that there is no inconsistency with the present disclosure.

FIELD OF THE INVENTION

The present invention is directed towards a betting system and methods of operating a betting system. In particular, the present invention describes an apparatus able to administer a live-event, non-fixed odds betting system where the house takes an active role in placing bets in addition to the usual roles of posting current odds, collecting bets, and distributing payoffs to winners. Additionally, the present invention describes a method for collecting data from multiple sources, automating the procedure of calculating odds for betting lines based on the data, placing bets on behalf of the house, and streaming the betting odds and data to the players, that is more accurate than pari-mutuel systems and less risky to the house than fixed odds systems.

BACKGROUND OF THE INVENTION

Most sports betting systems use fixed odds betting where the house (i.e., the organization operating the betting system) posts the payoff odds on the available choices, and winning players that place a bet while the line is open are guaranteed a payoff based on the posted odds when they placed the bet. Fixed odds betting is very common today with football, baseball, basketball, hockey, soccer, golf, tennis, and most other popular sport events. However, a few sports, like horse racing, dog racing, and jai alia, typically use pari-mutuel betting systems. In a pari-mutuel betting system, the odds paid on a winning bet depends on the sizes of the betting pools on each choice when the betting line closes, and may be different from the posted odds at the time the player placed the bet. There are also sports betting systems modeled on financial markets (e.g., prediction markets) where one "share" of a betting choice is worth a fixed amount if that choice wins, and zero if it loses. The profit on a winning share depends on the price paid by the player, which varies in time due to changing supply and demand.

As used herein, the "ultimate payoff odds" on a bet is the ratio of the amount a winning player wins (in profit) to the amount of the bet. So, for example, if a player bet $10 and received $100 back after winning the bet, then the ultimate payoff odds on that bet was 9:1 ($90 profit versus the initial bet of $10). If the probability that a given choice will be the winning choice is $1/(m+1)$, and if the house pays m:1 on that choice, then the house has no edge on the bet, i.e. the expected profit/loss for the player is zero.

Players obviously want to know how much profit they stand to make on a bet before they make the bet. The "posted payoff odds" on the betting choices at time t are typically the only current information provided by the house. In an honest sports betting system, the posted payoff odds at each time t are good-faith estimates of the ultimate payoff odds. In fixed odds betting, the posted odds on the choices at the time of a bet are exactly the ultimate payoff odds if that choice wins. This is also generally true in prediction market sports betting (even though it is usually not described this way). The posted payoff odds on a choice can be calculated from the asking price: it is the reciprocal of the asking price of a $1 share, minus 1. In any case, the player knows at the time of the bet exactly how much profit will be earned if the bet wins.

Pari-mutuel betting is different from fixed odds betting. In fixed odds betting, the ultimate payoff odds are the posted odds at the time of the bet. In pari-mutuel betting, the ultimate payoff odds is the ratio of the total money bet on all the choices to the total money bet on the winning choice while the line was open. At time t (before the line closes) the posted odds on choice j is the ratio of the total money bet on all the choices up to time t to the total money bet on j up to time t, minus 1. In general, the posted odds will vary in time, so the posted odds on a choice at the time of a bet may not be the same as the ultimate payoff odds on that choice if it wins. Pari-mutual betting systems, and other non-fixed odds systems can therefore be problematic in that players may prefer betting systems where the posted payoff odds at the time of their bet, and ultimate payoff odds if they win, are guaranteed to be the same. Several pari-mutual betting systems have attempted to address this issue by providing multiple independent pari-mutual betting lines for the same betting event (see for example, U.S. Pat. Nos. 7,454,380 and 7,740,539).

The present invention is similar to pari-mutuel betting in that the ultimate payoff odds may not be the exactly the same as the posted odds at the time of a bet. However, the present invention is different from pari-mutuel betting in significant ways. In the present invention, the posted odds at the time of a bet and the ultimate payoff odds are computed differently and are much closer to each other than for pari-mutuel; and crucially, in the present invention the house can adjust and control the posted and ultimate payoff odds during the betting event by making its own bets. In the present invention, house bets and posted odds are fully automated and controlled by an intelligent subsystem with fast access to historical sports data.

SUMMARY OF THE INVENTION

Within the categories of fixed odds, pari-mutuel, and prediction market sports betting, there are a number of variations and enhancements in the prior art. However, the present invention provides a sports betting system and method with a new way to provide real-time payoff odds and calculate ultimate payoff odds, wherein the house places bets in order to adjust and control the posted and ultimate payoff odds. The streaming real-time payoff odds and all house bets are fully automatic, as the present invention is controlled by an intelligent subsystem with fast access to various data inputs, such as historical sports data.

The posted odds are streamed in real time to the players. The current posted odds are calculated by the system based on the most recent set of house bets and the player bets that occurred after the house bets. The house bets, in turn, are controlled by an intelligent subsystem with fast access to data inputs, such as historical sports data. The betting system of the present invention therefore does not utilize or provide a fixed odds system, pari-mutuel system, prediction market system, nor any variant of those systems disclosed in the prior art.

In an embodiment, the present invention provides a betting system, preferably for in-progress sporting events, that is able to collect data from various inputs, selectively manipulate the data to generate improved estimates of the ultimate payoff odds in a non-fixed betting odds betting system, and provide the estimates to a plurality of end computer processors or electronic devices on a network. In an embodiment of the present invention, the betting system allows a plurality of players to place bets where the house places bets along with players. The system comprises an artificial intelligent subsystem (an "AI") designed to estimate real-time probabilities of outcomes associated with live events, and a host computer able to accept bets from players, place bets on behalf of the house based on the AI estimates, maintain a detailed electronic record on all betting activity (including house betting activity), estimate and stream up-to-date payoff odds based on the electronic record, and distribute payoffs on wining bets when the betting events terminate. In an embodiment, the AI unit works by searching for similar situations in an electronic historical database related to the live event, and then estimating the probability each choice will win by the fraction of times it won in the historical database. Other embodiments may use more sophisticated estimation techniques. The purpose of the house bets is to continuously and strategically adjust the real-time posted payoff odds to be in line with the AI estimates, and/or to create additional revenue for the house, as the house is entitled to profits from its winning bets in the present invention. Players can communicate with the host computer and place bets through physical devices, such as mobile electronic devices, personal computers, or stationary kiosks.

Betting occurs before and/or during a betting event such as an entire sporting event (like a football game), or parts of sporting events like a single drive in a football game, an inning in a baseball game, a set in a tennis match, or a round in a knockout tournament like March Madness or the Stanley Cup playoffs. Betting events can also be based on non-sporting events like award shows, reality shows, and elections. During the live events, one or more betting lines are provided for each betting event, where there is a set of betting choices (i.e., possible outcomes of the betting event) that players can bet on while the betting lines are open. The betting choices are preferably mutually exclusive, i.e., no more than one of them will be the winning choice. While the betting lines are open, players can bet whenever they want and as much as they want, subject to house rules. In an embodiment, there may be intervals of time during the betting event when betting is paused; for example during the actual plays in a football game, or during points in a tennis match. All payoffs are made after the betting event terminates.

In an embodiment, the present invention provides a betting system between a host computer and a plurality of remote electronic devices, wherein the betting system is operating during a live event. The method comprises the steps of:

a) generating a betting event associated with said live event on the host computer, wherein the betting event is based on actions occurring during said live event, and electronically transmitting data relating to said live event and betting event from the host computer to the plurality of electronic devices;

b) opening one or more betting lines on the host computer for said betting event before the start or during the betting event, but before a termination event occurs with regard to the betting event, each betting line comprising two or more mutually exclusive betting choices from a finite set of possible outcomes associated with the selected betting event;

c) electronically transmitting betting line data from the host computer to the plurality of electronic devices, wherein each of the plurality of electronic devices is able to select a desired betting choice for each of the one or more betting lines while the betting line is open;

d) the host computer electronically receiving selected betting choice data from the plurality of electronic devices;

e) at one or more time periods, placing a house bet on one or more betting choices of a selected betting line, wherein each house bet is in an amount that is able to be the same or different from one another, and wherein the amount of each house bet and the time of each house bets for the selected betting line are placed by the host computer and are determined by a first predetermined algorithms based on data from an artificial intelligence (AI) feed, wherein, while the one or more betting lines remain open, the host computer continuously estimates ultimate payoff odds for the betting choices as determined by a second predetermined algorithm based, and electronically transmits said payoff odds to the plurality of electronic devices; and f) automatically monitoring the betting event until a termination event occurs with regard to the betting event, determining a winning choice on each betting line after the termination event, and terminating the betting lines on the host computer upon occurrence of the termination events.

At certain times during the betting event the house will make bets. The precise betting times and betting amounts for the house are determined by the AI. The AI streams data to the host (also referred to herein as the AI feed), which includes estimates of the current probabilities that each of the betting choices on a betting line will prevail. Said estimates are based on historical sports data, and other relevant information. The precise timing and amounts of the house bets are determined by the host computer from the AI feed. In addition, the host computer maintains an electronic record (such as a spreadsheet) that lists the details of every bet made up to the present by players and the house, computes the real-time odds for the choices on the betting line from the electronic record, and streams them to the players mobile devices and/or fixed kiosks or other displays.

House bets are made at times $\{t_0, t_1, \ldots, t_n\}$, where $t_0$ is around the time the betting event starts, $t_n$ is around the time the betting event terminates, and the other times are at irregular intervals. In the present invention, the number of times the house will bet during the betting event, n, and the precise times of those bets, $\{t_0, t_1, \ldots, t_n\}$, are not known ahead of time. They are determined in real time by the host computer from the continuous stream of information in the AI feed. House bets are preferably in exact proportion to the estimated probabilities of the outcomes, because this can be shown mathematically to minimize the risk to the house. House bets have the same status and effects on payoff outcomes as bets placed by the players.

Preferably, the house bets are simultaneously placed on each of the betting choices of a selected betting line, and the house bet amount for each choice is proportional to a current estimated probability (from the AI feed) of that choice becoming the winning choice. Preferably, the house bets are placed at times $\{t_0, t_1, \ldots, t_n\}$ which are determined in real time from the AI feed by continuously observing changes in the estimated probabilities that the choices will win. When the probabilities change by more than a threshold amount since the last time the house made bets, the house bets again. (Since there are always k>1 choices in the choice set, the choice probabilities are a vector $(p_1, \ldots, p_k)$. The house therefore needs a way to measure changes in probability vectors in the present invention. In one embodiment, the distance between probability vectors is the square root of the sum of the individual squared differences (i.e., Euclidian distance.) This procedure continues until the betting event terminates, so the number of house bets and the amounts of those bets cannot be known ahead of time. With regard to the estimated posted odds, the posted odds on a choice j at a time t is preferably calculated from all bets placed from the previous house betting time $t_i$ up to time t; and the ultimate payoff on a winning bet placed at time t depends on all bets placed between times $t_i$ and $t_{i+1}$.

In an embodiment, the host computer creates and maintains a detailed electronic record, such as a spreadsheet, of the time and amount every bet made by the players and the house during the betting event (also referred to herein as the BetLog). The house uses the data in the BetLog to post payoff odds based on the most up to date information, and also to determine the payoffs on winning bets when the betting event terminates. The posted payoff odds are good faith estimates of the eventual payoff odds, but are not guaranteed to be exact. The posted payoff odds in the present invention are significantly more accurate than the posted odds in a pari-mutuel system because of the way the odds are calculated in the present invention.

In an embodiment, the present invention provides a method of providing a betting system between a plurality of players, wherein the betting system is based on a live event. The method comprises the steps of: a) selecting a betting event associated with said live event, wherein the betting event is based on actions occurring during said live event; b) opening one or more betting lines for said selected betting event before the start or during the betting event, but before a termination event occurs with regard to the betting event, each betting line comprising two or more mutually exclusive betting choices from a finite set of possible outcomes associated with the selected betting event; c) allowing the players an amount of time to selectively place bets on the betting lines while the betting lines are open, transferring bet amounts corresponding to bets placed by the players from player bank accounts to betting pools corresponding to the selected betting choices, and recording data associated with said bets in a BetLog, wherein the data associated with a bet is comprised of a time of the bet, the betting line and choice, the bet amount, and the bettor's identification; d) at one or more time periods, placing a house bet on one or more betting choices of a selected betting line, wherein each house bet is in an amount that is able to be the same or different from one another, and wherein the amount of each house bet and the times of the house bets for the selected betting line are determined by a first predetermined algorithm based on the data from an artificial intelligence (AI) feed, wherein the amounts of the house bets are transferred from a house bank account to the betting pools corresponding to the selected betting choices, and wherein the data associated with the house bets are recorded in the BetLog, wherein data associated with each house bet is comprised of the time of the bet, the betting line and choice, and the house identification; e) during the time when players are allowed to bet on the betting lines, continuously estimating ultimate payoff odds for the choices as determined by a second predetermined algorithm based on data in the BetLog, and continuously communicating said payoff odds to the players; f) monitoring the betting event until a termination event occurs with regard to the betting event, determining a winning choice on each betting line after the termination event, and terminating the betting lines upon occurrence of the termination events; and g) upon termination of the betting event, paying winning players of the one or more betting lines amounts determined by a third predetermined algorithm, based on data in the BetLog, and transferring said winning players' winnings from the betting pools into bank accounts of the winning players, and wherein winning house bets are also transferred from the betting pools into the house bank account.

Optionally, the betting event is a live sporting event including, but not limited to, a half-inning in a baseball game (where the betting choices are 0 runs, 1 run, 2 runs, >2 runs), an at-bat in a baseball game (where the betting choices are Home Run, Single, BB, K, Fly Out, Ground Out, Other), a set of downs in a football game (where the betting choices are Touchdown, Field Goal, Punt, Turnover, and New First Down), a drive in a football game (where the betting choices are Touchdown, Field Goal, Punt, and Turnover), a k-game football parlay (where the betting choices are the $2^k$ possible winning and losing combinations) or a set in a tennis match (where the betting choices are the possible scores, like 6-3). In every case the betting choices are preferably mutually exclusive so that exactly one choice wins every time.

In an embodiment, the invention provides a system for providing a betting game between a plurality of players, where the betting game is based on actions occurring during a live event, and where said system is under the control of a host computer. The system includes a host processor programmed for analyzing and processing input data from players and from an AI feed, and outputting data and information to players relevant to the betting game. The host processor is programmed to:

i) provide one or more selectable betting events to the players while the live event is in progress, wherein each betting event is based on actions occurring during said live event;

ii) open one or more betting lines for each selected betting event before the start or after the start of the live event but before a termination event occurs with regard to the betting event, each betting line comprising two or more mutually exclusive betting choices corresponding to a finite set of possible outcomes of the selected betting event;

iii) allow the players an amount of time before or during the betting event to selectively bet on the betting lines;

iv) at one or more time periods, place a house bet on one or more betting choices of a selected betting line, wherein each house bet is in an amount that is able to be the same or different from one another, and wherein the amount of each house bet and the time period to make the house bets for the selected betting line are determined based on a first predetermined algorithm;

v) during the time when players are allowed to bet on the betting lines, calculate estimated payoff odds based on placed bet data and the second predetermined algorithm and post said estimated payoff odds to the players;

vi) closing the one or more betting lines after an interval of time such that no further bets may be placed on the betting lines, wherein player bets and house bets are combined to form a total bet amount for each betting line;

vii) monitor the live event until a termination event occurs with regard to the betting event;

viii) terminate the betting event upon occurrence of the termination event; and ix) upon termination of the betting event, pay winners of the one or more betting lines according to the total bet amount for each betting line and a third predetermined algorithm, wherein winning house bets are paid to a house account.

In a further embodiment, the system further comprises a plurality of player processors interactively connected to the host processor, where each player processor is able to send and receive data to the host processor. Optionally, a display and interface device operatively associated with each player processor is part of the system, where the display and interface device is able to display data received from the host computer, and is able to send betting instructions entered by the player to the host computer through the player processor. Preferably, an administrative processor is interactively connected to the host processor, where the administrative processor is able to send commands to the host processor. An administrative display and interface device is operatively associated with the administrative processor, where the administrative display and interface device is able to display data received from the host processor, and is able to send commands entered by the administrator to the host processor. The commands entered by the administrator control when the host processor opens and closes the betting line, and when the host processor terminates the betting line.

DETAILED DESCRIPTION OF THE INVENTION

Figure 1:
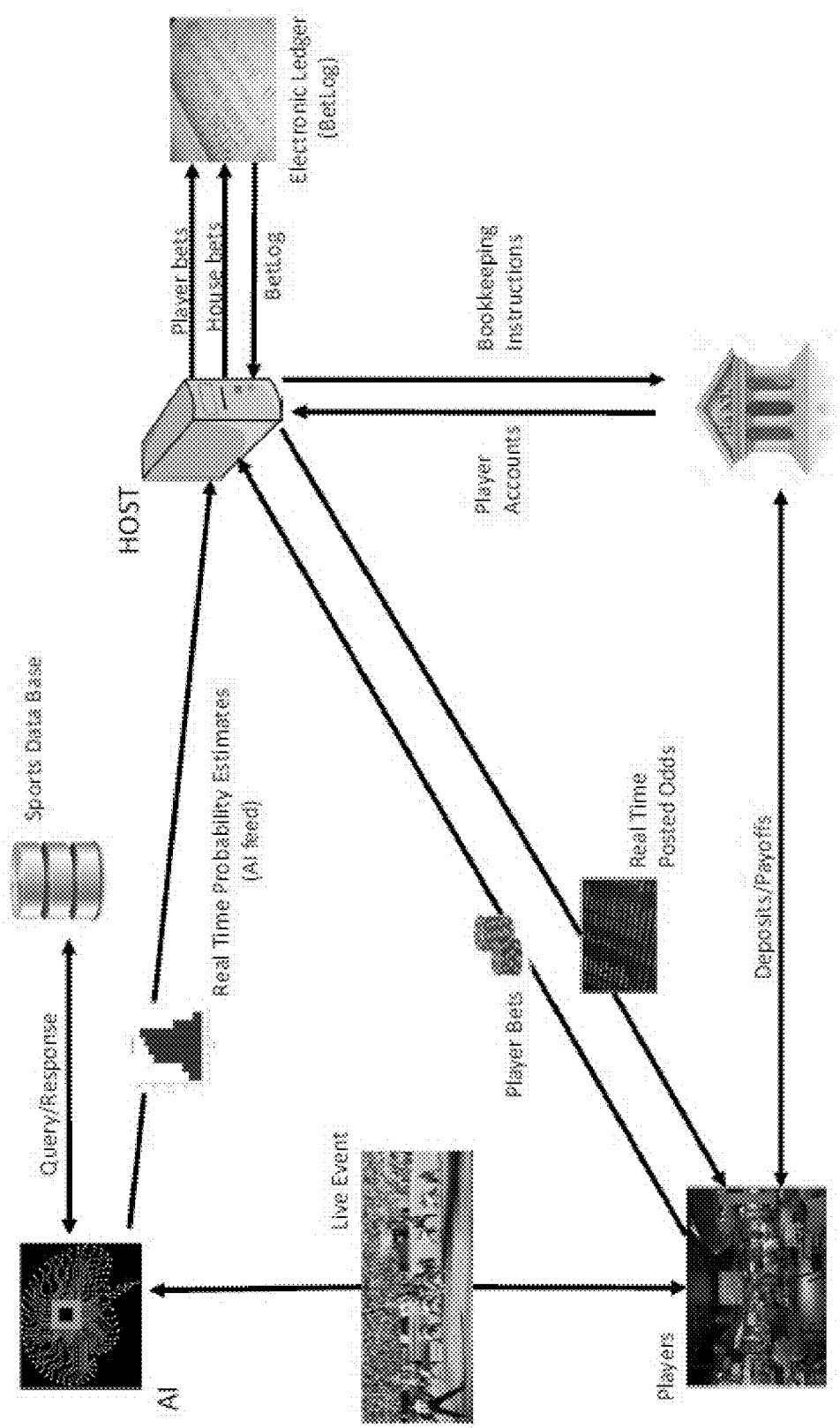
FIG. 1 shows a high level structure of a betting system in an embodiment of the present invention. As illustrated in the figure, the host processor communicates with an AI system that estimates probabilities associated with the choices on the betting lines (illustrated further in FIGS. 2 and 3), a plurality of players, who observe the posted odds and place bets (illustrated further in FIG. 4), a "bank" where player and house funds are stored and exchanged (illustrated further in FIG. 5), and an electronic ledger (herein called BetLog) that records the details of every bet placed by the players and house (illustrated further in FIG. 6).

As used to describe the present invention, the following terms are defined as follows.

The "house" is the generic name for the person or entity administering the betting system of the present invention. The house may be a bricks and mortar casino or business, or may be a web site on the internet. "House rules" are rules that have no effect on the logical operation of the betting system of the present invention, such as minimum or maximum bet sizes for the players, or circumstances when bets are not allowed. A "player" is someone other than the house that is placing bets on a betting event using the betting system of the present invention.

The "host" or "host computer" is the central processor where all the component parts of the betting system of the present invention either reside or communicate with, and that processes data from the component parts as required by the betting system. The component parts ("AI system", "BetLog", and "Bank") are defined below.

A "live event" refers to a sporting event or any other unpredictable event that proceeds over time with an unambiguous beginning and end, including but not limited to sporting events, elections, and award shows. A "sporting event" is an athletic contest of some sort, including but not limited to a football game, baseball game, basketball game, hockey game, tennis match, golf tournament, Olympic event, boxing match, martial art fight, and wrestling match. A "live sporting event" is a sporting event that is occurring in the present. Additionally, a live sporting event can include a prerecorded sporting event if the players do not know anything about the outcome or events that took place during the event. A live sporting event could also be a simulated sporting event, as long as the outcome cannot be determined in advance.

A "betting event" is a selectable item corresponding to actions occurring during a live event whereby players of the betting system can select "betting lines" associated with the betting event, and place bets on the different possible outcomes of the selected betting line. A betting event can be a whole football game, a whole baseball game, etc.; or a collection of whole games, like a tournament or playoff. A betting event can also be a part of a sporting event, like a drive in a football game, an inning in a baseball game, a set in a tennis match, etc.

A "betting line" is a selectable item that contains two or more mutually exclusive "betting choices", corresponding to possible outcomes that can occur in a betting event. A "betting pool" is all the money bet on a betting choice in a specified time frame. For example, a betting line for a generic sporting event may have the choices: Team A wins, or Team B wins. The betting pools for Team A and Team B consist of all the money bet on each team. A betting line for a drive in a football game may have the betting choices, Touchdown, Field Goal, Punt, and Turnover. A betting line for a 3-game parlay would have eight betting choices, corresponding to the 2×2×2=8 possible outcomes. It is possible for a betting event to have different betting lines with different betting choices. By "opening a betting line," it means the players are then allowed to bet on the betting choices on that betting line. By "pausing a betting line," it is meant that no bets may be placed on the betting line during the pause. By "terminating a betting line," it is meant that the outcome (i.e., winning choice) of the betting line has been determined and it is then possible to pay the winners of the betting line.

"House bets" refer to the money, tokens, chips or credits placed on a betting line by the house. The purpose of house bets is to stabilize the odds of a betting line, change the odds on a betting line, and/or make money for the house. House bets have the same effect on the posted and ultimate payoff odds for a betting line as bets made by players. In the present invention, the house is entitled to the payoffs on winning bets, just as players are. In an embodiment, house bets are made at times $\{t_0, t_1, \ldots, t_n\}$, where the first house bets occur at time $t_0$ (preferably around the time when the betting line opens), at time $t_i$ the host determines $\{p_1(t_i), \ldots, p_k(t_i)\}$ (i.e., the probabilities of winning for the k choices, as estimated at time $t_i$), and the house bets again at time $t_{i+1}$ (the first time the probabilities differ from $\{p_1(t_i), \ldots, p_k(t_i)\}$ by more than a threshold amount).

An "AI system" or "intelligent system" in the present context is a computer system (as opposed to human experts) that can observe a live event continuously during the live event, and (in real time) estimate the probability that each of the betting choices on a betting line will become the winning choice when the betting event terminates. For example, the AI could access data associated with historical football games that had a similar "state" as the present game (e.g., using a sports database) and determine the fractions of those similar games where each choice on the betting line won. One could also design a neural network AI system that trained on a sports database, or one that learned from experience. The "AI feed" is a continuous stream of probability vectors $(p_1(t), \ldots, p_k(t))$ generated by the AI system. The host uses the AI feed to determine the timing and amounts of the house bets. The AI system could reside in the host computer or be on a separate processor or network of processors that communicates with the host.

The "BetLog" is an electronic ledger that contains information associated with every bet made on every betting line in the betting system of the present invention. For each bet, including house bets, there is a record including the precise time of the bet, the amount of the bet, the betting line and betting choice, and the player's (or house's) identification. The BetLog could reside in the host computer or be on a separate processor that communicates with the host.

The "Bank" allows players to open "accounts" where they keep their money used for placing bets in the betting system of the present invention. The system withdraws from players' accounts when they make bets and deposits all winnings into the accounts. Players can add money to their accounts, or cash out subject to house rules. The house also has an account in the Bank. The Bank could be a virtual bank controlled by the house that resides in the host computer, or it could be an outside commercial bank that communicates electronically with the host computer in support of the betting system.

In the following detailed description, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Overview

Figure 2:
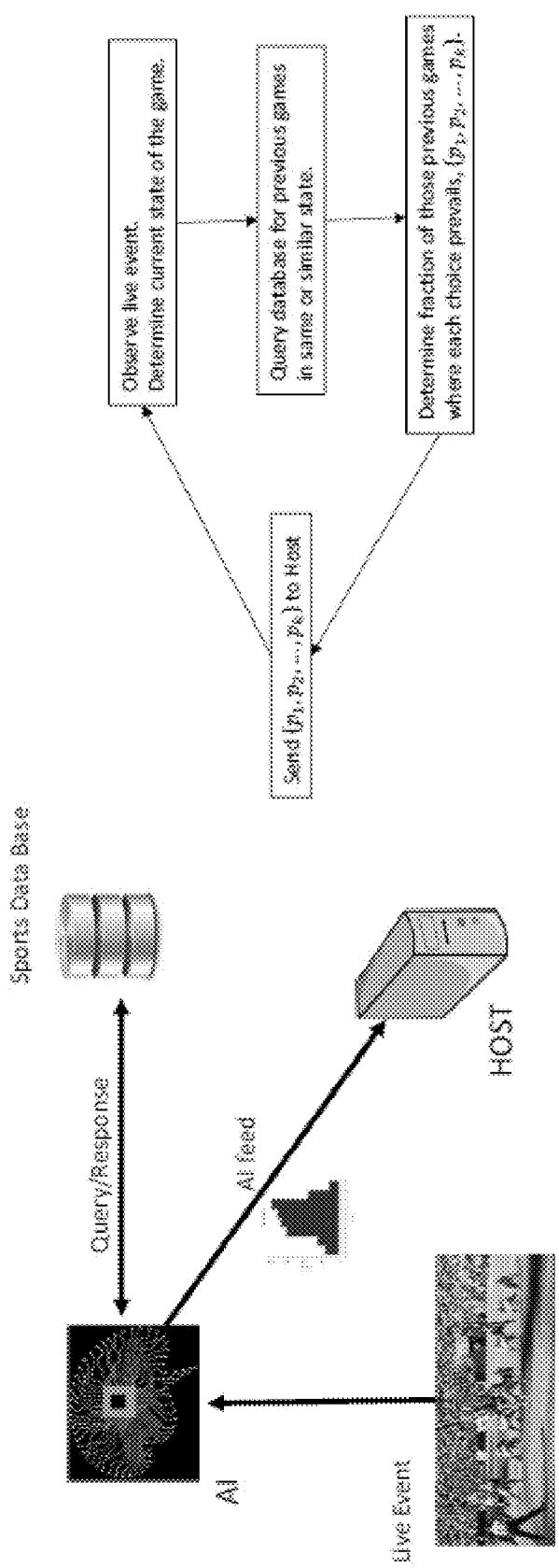
FIG. 2 shows how the AI estimates probabilities in an embodiment. The AI is aware of the "state" of the live event. The AI queries the sports database for historical games that were in that state, or a similar state, and determines the fraction of those games where each of the betting choices became the winning choice, as shown in the flow diagram. The AI is continuously doing this task and communicating the resulting probability vector to the host (herein called the AI feed).

The present invention provides a betting system, apparatus, and methods for administrating a betting system, for a live event where the house is able to place bets on the betting choices of the betting lines along with the players. The payoff amount for a given winning bet is determined from the precise time and amount of the bet, and the precise times and amounts of all other bets, including house bets, as kept in the BetLog. The method for determining the payoffs from the information on the BetLog will be specified below (and FIG. 5). The house bets occur at irregular intervals based on real time calculations on the data from the AI feed (FIG. 2). The method for determining the timing and amounts of house bets will also be specified below (also, FIG. 3). Preferably, the house bets are used to stabilize the posted payoff odds on the betting line, change the posted payoff odds when there is a sudden shift in the AI feed, e.g., after a big play, and to make additional revenue for the house.

Figure 6:
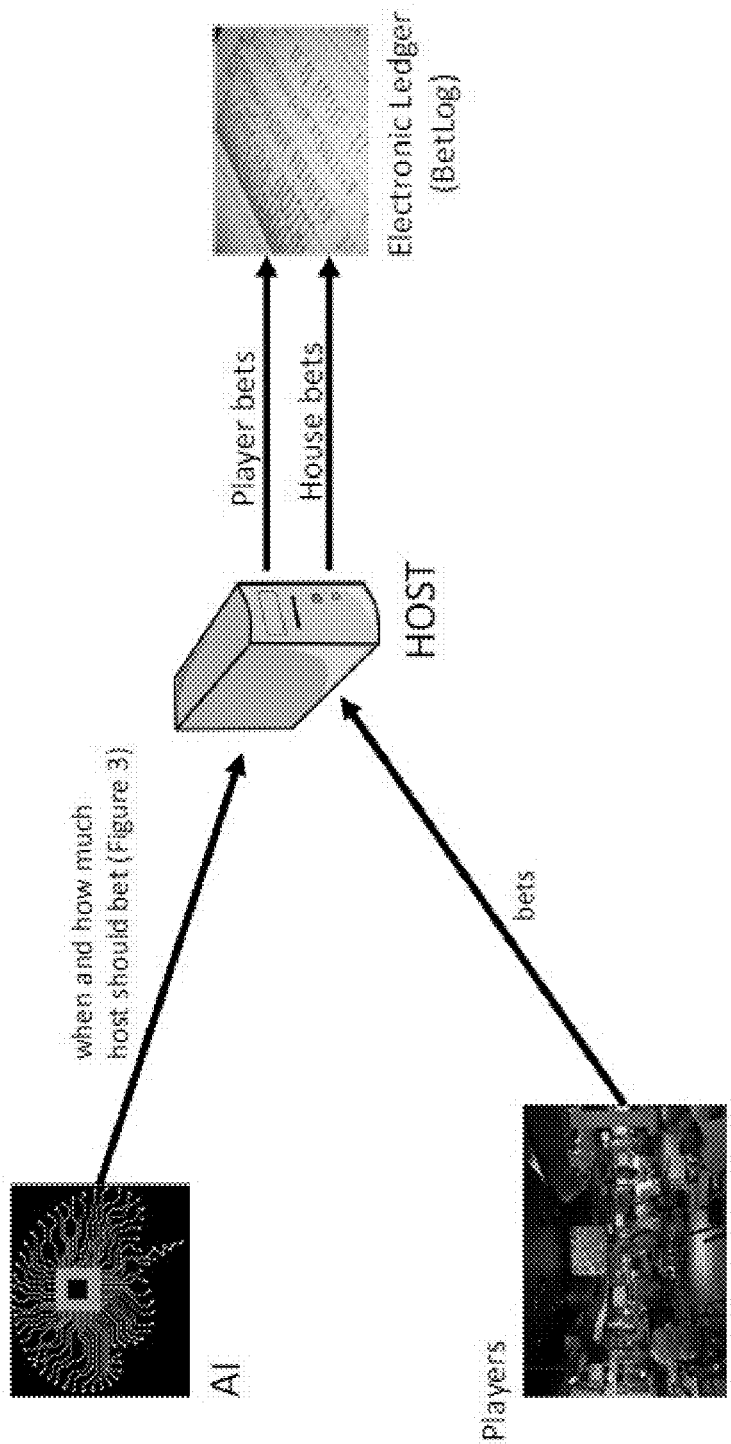
FIG. 6 shows how the players host and bank communicate so that all bets are logged in the electronic ledger (herein called the BetLog), and payoffs can be made when the betting event terminates.

Players can place bets at any time during a betting event, subject to house rules. Once a bet is made, the bet amount is transferred from the player account into the betting pool of the corresponding betting choice, and is noted on the electronic ledger, BetLog (FIG. 6). Player bets affect the posted payoff odds and the ultimate payoff odds.

Figure 3:
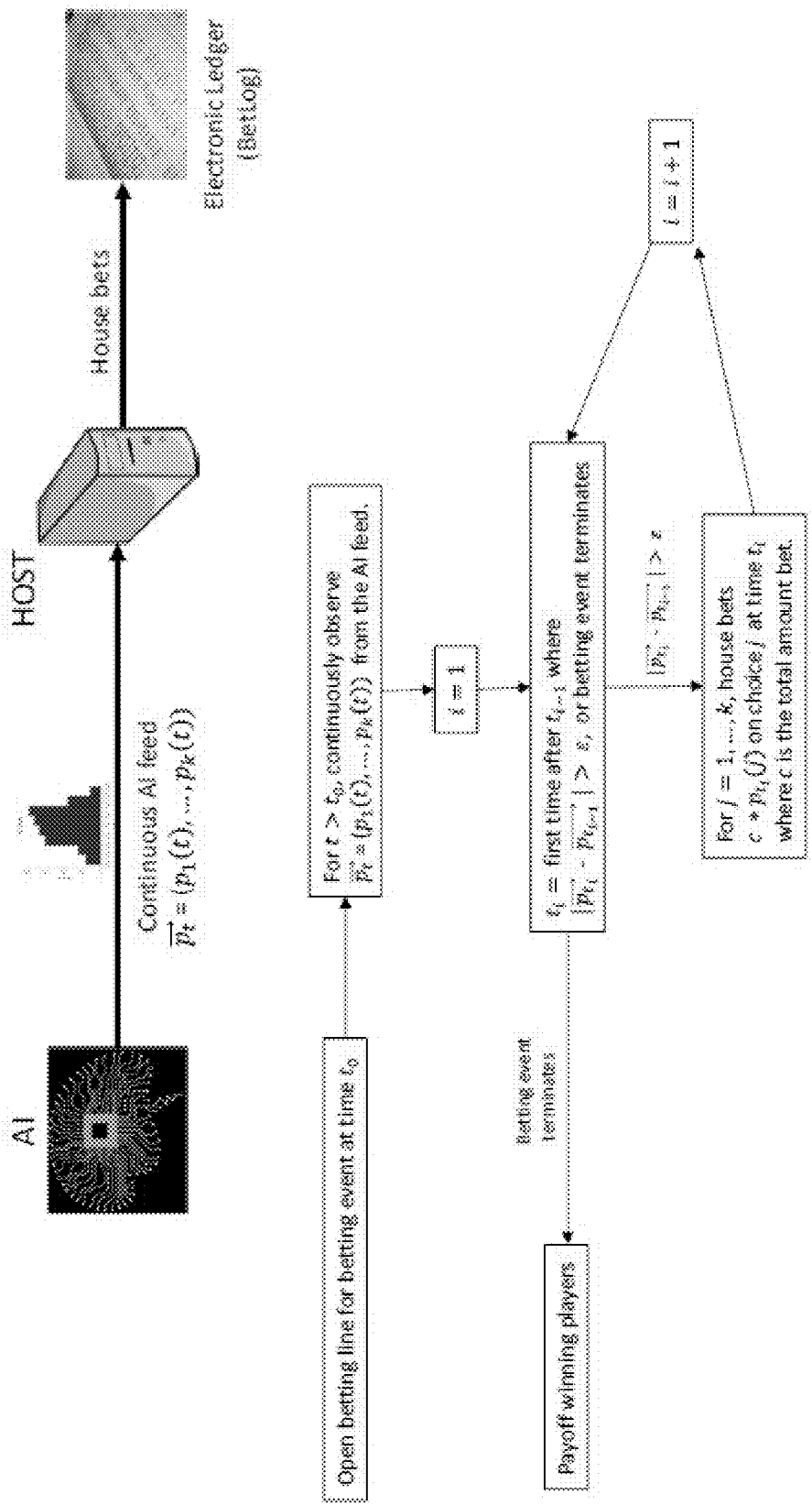
FIG. 3 shows how the host uses the AI feed to determine when the house should place bets, and the relative sizes of those bets. Whenever the house bets, the amounts bet on the choices are proportional to the current probabilities on the choices from the AI feed. Note, this usually means some money will be bet on every choice, but the proportions will all be different. In order to determine when to bet, the host continuously monitors the AI feed, and when the probabilities have changed by more than a given threshold from the last time the house bets, the house bets again, as shown in the flow diagram.

The house can also make bets on its own behalf. The house bets influence the posted and ultimate payoff odds just like player bets. One purpose of the house bets is to influence those odds in a strategic manner. When the house bets, it typically bets on all choices simultaneously. The relative sizes of the house bets for each choice are determined by the AI feed, coupled with a special betting strategy that minimizes risk for the house (FIG. 3). The special betting strategy preferably allocates an amount to each choice that is proportional to the probability that it becomes the winning choice as predicted by the AI feed. The times of the house bets are also determined in real time by the AI feed (FIG. 3). BetLog is updated with the house bets just like the player bets.

Figure 4:
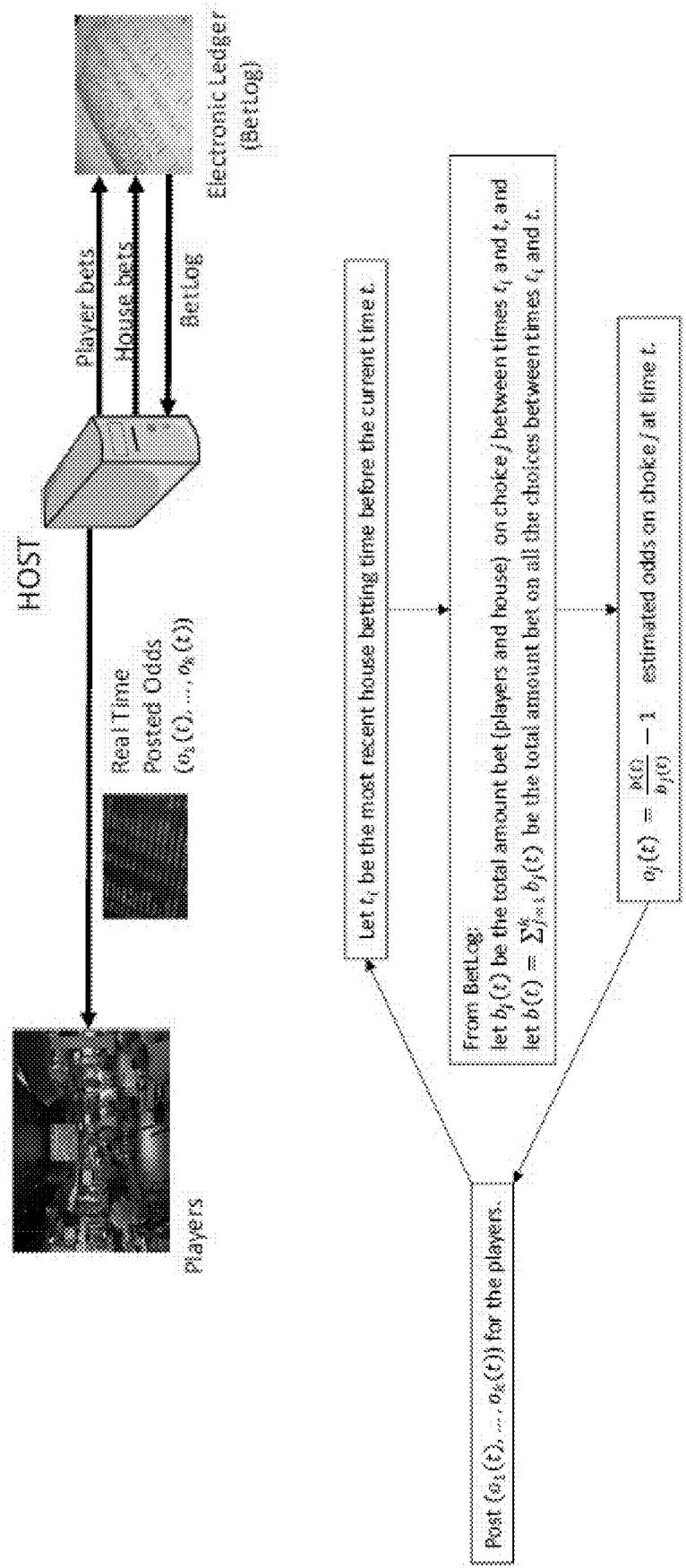
FIG. 4 shows how the house posts and updates the current odds on the betting choices for the players. The host always knows the previous time the house made bets, $t_i$, and keeps track of how much the players bet on each of the choices between $t_i$ and the present. The host adds the house bet sizes at $t_i$ to the player pools, and calculates the odds on each choice from those numbers, as shown in the flow diagram.
Figure 5:
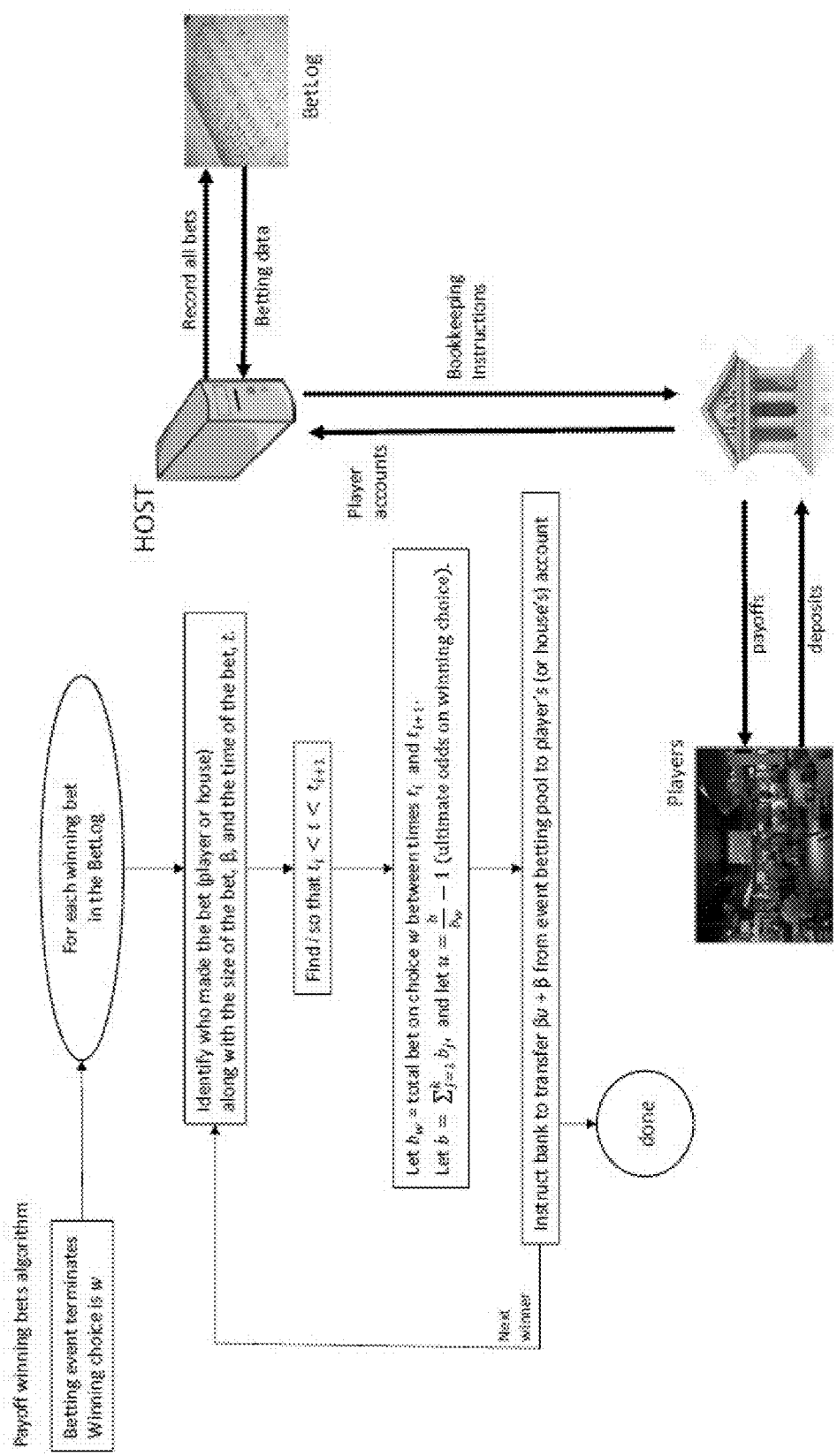
FIG. 5 shows how payoffs are made after a betting event terminates. For each bet made on the winning choice (including house bets) the host determines which interval ($t_i$, $t_{i+1}$) the bet was made, and calculates the payoff from the totality of bets that were made in that interval, as shown in the flow diagram.

The posted payoff odds on the choices change in time and are always good-faith estimates of the ultimate payoff odds, but are not guaranteed to be exact (FIG. 4). Once the betting event terminates, the ultimate payoff odds on winning bets are determined based on the totality of data contained in the BetLog constructed during the betting event (FIG. 5). For each bet made during the betting event (players and house), the BetLog contains the bettor's identification, the time of the bet, the amount of the bet, and the betting line and choice (FIG. 6). The house is entitled to the payoffs on its winning bets, so another purpose of the house bets is to make additional revenue for the house.

Additional exemplary embodiments of the present invention are described in the following examples.

In one embodiment of the present invention, a host computer communicates with an AI system that continuously feeds the host computer with real-time estimates of the probabilities that each betting choice (1, 2, . . . , k) will prevail for a given betting event (FIG. 2). For example, in a football game the state may be "first and 10 from the 20 yard line with 5 minutes remaining in the third quarter, and the score 17-10". The AI queries the sports database for historical games that were in that state, or a similar state, and determines the fraction of those games where each of the betting choices became the winning choice, as shown in the flow diagram. The betting choices are mutually exclusive, meaning that only one of the choices will win. The host computer also communicates with a network of devices (mobile devices, kiosks, etc.) that players use to monitor the posted payoff odds on the choices, place bets, and receive messages (FIG. 4). The host computer also communicates with a "bank" where players have accounts, as does the house (FIG. 5). When players make bets, the host computer transfers money from the player accounts and deposits the bets in the house's bank account. At the same time, it updates a spreadsheet (the BetLog) of betting activity so the players can be paid (from the house's bank account) the exact amount they are owed if they win (FIG. 6). The data stored on the BetLog has a line for each bet, including the time of the bet, the amount of the bet, the betting choice, and the owner of the bet. In this embodiment the times $\{t_0, t_1, \ldots, t_n\}$ when the house places bets occur relatively frequently (FIG. 3).

In an embodiment, the algorithm that determines the sequence of times house bets are made, $\{t_0, t_1, \ldots, t_n\}$, in this example works as follows (FIG. 3).

The first house bets occur at time $t_0$, around the time when the betting line opens.

At time $t_i$ the host records $\{p_1(t_i), \ldots, p_k(t_i)\}$, the probabilities of winning for the k choices, as estimated by the AI feed at time $t_i$.

The house bets again at time $t_{i+1}$, which is the first time the probabilities from the AI feed differ from $\{p_1(t_i), \ldots, p_k(t_i)\}$, by more than a threshold amount. (In an embodiment, the difference between two probability vectors is the square root of the sum of the squared differences of the components, i.e., Euclidian distance.)

At each $t_i$ the house bets on every choice r in an amount exactly proportional to $p_r(t_i)$. The total amount bet at time $t_i$ is determined by house rules. In this embodiment the total bet is approximately equal to the total amount the house expects the players to bet in the interval $[t_i, t_{i+1})$. During the time interval $[t_i, t_{i+1})$ the posted odds on each choice are based on the bets made in that interval by the players and the house. In particular, if t is in that interval, and if $m_{r,i}(t)$ is the amount bet by the players and house on choice r in the interval $[t_i, t)$, then the posted odds on choice j at time t is given by $$\sum_r \frac{m_{r,i}(t)}{m_{j,i}(t)} - 1.$$

In this embodiment, the posted odds are good-faith estimates of the eventual odds payed, but are not promised to be exact. If choice j turns out to be the winning choice, then the ultimate payoff odds paid for bets made on choice j during $[t_i, t_{i+1})$ is given by $$\sum_r \frac{m_{r,i}(t_{i+1})}{m_{j,i}(t_{i+1})} - 1.$$

Preferably, the house betting times $\{t_0, t_1, \ldots, t_n\}$ are closely packed, so the posted odds will usually be good estimates of the ultimate odds. The times between house bets is controlled by the threshold parameter (FIG. 3). In the present invention, the house is entitled to all the payoffs on all its winning bets in addition to any fees it charges players on their bets. Players with winning bets get a share of the house's losing bets as well as the other players' losing bets. The host deposits the amount won into winning players' bank accounts, and sends appropriate messages to all the players on their devices (FIG. 5).

This embodiment can be used as a general-purpose, in-game, real-money sports betting system. For example: the betting event could be a 3-game football parlay. In this case there are 8 mutually exclusive betting choices, corresponding to the 2×2×2=8 possible outcomes of winners and losers of the 3 games. During the 3 games, the AI continuously determines the up-to-date probabilities of the 8 possible outcomes by multiplying the current win/loss probabilities associated with each game, and communicates the results to the host. In other words, in terms of the home teams, the probability the betting choice "WLW" prevails would be estimated as the probability the first home team wins, times the probability the second home team loses, times the probability the third home team wins. At times $\{t_0, t_1, \ldots, t_n\}$ the house places bets on all 8 choices, where the amounts bet on the choices are exactly proportional to the current probabilities estimated by the AI feed (FIG. 3).

Alternatively, the betting event could be a drive in a football game with mutually exclusive choices {Touchdown, Field Goal, Punt, Turnover}. During the drive, the AI feed continuously determines the probabilities of the four outcomes and communicates the results to the host. At times $\{t_0, t_1, \ldots, t_n\}$ the house places bets on all four choices, where the amounts bet on the choices are exactly proportional to the current probabilities estimated by the AI feed (FIG. 3).

Alternatively, the betting event could be an at-bat in a baseball game with mutually exclusive choices {single, double, triple, Home Run, Strike out, Ground out, Fly out, Walk, Other}. During the at-bat, the AI continuously determines the probabilities of the nine outcomes and communicates the results to the host. At times $\{t_0, t_1, \ldots, t_n\}$ the house places bets on all nine choices, where the amounts bet on the choices are exactly proportional to the current probabilities estimated by the AI (FIG. 3).

The betting event could be a half-inning in a baseball game with mutually exclusive choices {0 runs, 1 run, 2 runs, 3 runs, >3 runs}. During the at-bat, the AI continuously determines the probabilities of the five outcomes and communicates the results to the host. At times $\{t_0, t_1, \ldots, t_n\}$ the house places bets on all five choices, where the amounts bet on the choices are exactly proportional to the current probabilities estimated by the AI (FIG. 3).

Betting events associated with other sports would be performed in a similar way.

Having now fully described the present invention in some detail by way of illustration and examples for purposes of clarity of understanding, it will be obvious to one of ordinary skill in the art that the same can be performed by modifying or changing the invention within a wide and equivalent range of conditions, formulations and other parameters without affecting the scope of the invention or any specific embodiment thereof, and that such modifications or changes are intended to be encompassed within the scope of the appended claims.

When a group of materials, compositions, components or compounds is disclosed herein, it is understood that all individual members of those groups and all subgroups thereof are disclosed separately. Every formulation or combination of components described or exemplified herein can be used to practice the invention, unless otherwise stated. Whenever a range is given in the specification, for example, a temperature range, a time range, or a composition range, all intermediate ranges and subranges, as well as all individual values included in the ranges given are intended to be included in the disclosure. Additionally, the end points in a given range are to be included within the range. In the disclosure and the claims, "and/or" means additionally or alternatively. Moreover, any use of a term in the singular also encompasses plural forms.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements.

One of ordinary skill in the art will appreciate that starting materials, device elements, analytical methods, mixtures and combinations of components other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. The invention illustratively described herein suitably may be practiced in the absence of any element or elements, limitation or limitations which is not specifically disclosed herein. Headings are used herein for convenience only.

All publications referred to herein are incorporated herein to the extent not inconsistent herewith. Some references provided herein are incorporated by reference to provide details of additional uses of the invention. All patents and publications mentioned in the specification are indicative of the levels of skill of those skilled in the art to which the invention pertains. References cited herein are incorporated by reference herein in their entirety to indicate the state of the art as of their filing date and it is intended that this information can be employed herein, if needed, to exclude specific embodiments that are in the prior art.

The invention claimed is:

1. A method of providing a betting system between a host computer and a plurality of remote electronic devices, wherein the betting system is operating during a live event, wherein said method comprises:
   a) generating a betting event associated with said live event on the host computer, wherein the betting event is based on actions occurring during said live event, and electronically transmitting data relating to said live event and betting event from the host computer to the plurality of electronic devices;
   b) opening one or more betting lines on the host computer for said betting event before the start or during the betting event, but before a termination event occurs with regard to the betting event, each betting line comprising two or more mutually exclusive betting choices from a finite set of possible outcomes associated with the selected betting event;
   c) electronically transmitting betting line data from the host computer to the plurality of electronic devices, wherein each of the plurality of electronic devices is able to repeatedly select a desired betting choice for each of the one or more betting lines while the betting line is open;
   d) electronically receiving selected betting choice data from the plurality of electronic devices by the host computer, and recording the selected betting choice data in a BetLog, wherein the selected betting choice data comprises a time of the bet, the betting line and choice, bet amount, and bettor's identification;
   e) at one or more time periods $\{t_0, t_1, \ldots, t_k\}$, placing a house bet on one or more betting choices of a selected betting line, wherein each house bet is in an amount that is able to be the same or different from one another, where a first house bet is at time $\tau_0$ when the betting line opens; and an artificial intelligence (AI) feed continuously estimates the probabilities of the betting choices $p_r = (p_r(1), \ldots, p_r(n))$ becoming the winning choice, where n is a number of betting choices, and $p_r(i)$ is the estimated probability choice i will be the winning choice at time t; and placing additional one or more house bets at a time $\tau_{j+1}$, where the probabilities of the betting choices becoming the winning choice at times $\tau_j$ and $\tau_{j+1}$ differ from one another by more than a threshold $\epsilon$ for the first time according to the formula:

$\tau_{j+1} = \inf\{t > \tau_j : \|p_t - p_{\tau_j}\| > \epsilon\}$, where $\|\cdot\|$ is Euclidian distance, and wherein a house bet amount $\beta_r$ for each betting choice r at time $\tau_j$ is determined by the formula $\beta_r = b \cdot p_{\tau_j}(r)$, $r = 1, \ldots, n$, where b is the total amount bet,
   and wherein the amount of each house bet and the time of each house bet for the selected betting line are computed by the host computer;
   f) recording data associated with the house bets and player bets in the BetLog, wherein data associated with a bet is comprised of the time of the bet, the betting line and choice, and player or house identification;
   wherein, while the one or more betting lines remain open, the host computer continuously estimates ultimate payoff odds based on the AI feed and the data in the BetLog at time t for choice j as determined by the formula $\Sigma m_r(t)/m_j(t) - 1$, where $m_r(t)$ is a total amount bet on choice r, starting from the previous house betting time up to time t, and the host computer electronically transmits said payoff odds to the plurality of electronic devices; and
   g) automatically monitoring the betting event until a termination event occurs with regard to the betting event, determining a winning choice on each betting line after the termination event, terminating the betting lines on the host computer upon occurrence of the termination events, and paying the winning choices of the betting lines in amounts determined based on data in the BetLog, wherein the ultimate payoff odds on a winning bet placed for choice j at time t is given by the formula $\Sigma m_r(t_i)/m_j(t_i) - 1$, where $t_i$ is a next house betting time after t, or the termination time, whichever is smaller.

2. The method of claim 1 wherein the betting event is a live sports event.

3. The method of claim 1 wherein the betting event is a k-game football parlay and the betting choices are the $2^k$ possible winning and losing combinations.

4. The method of claim 1 wherein the betting event is a drive in a football game and the betting choices include touchdown, field goal, punt, and turnover.

5. The method of claim 1 wherein the betting event is a half-inning in a baseball game or an at-bat in a baseball game.

6. The method of claim 1 wherein the betting event is a set of downs in a football game.

7. The method of claim 1 wherein the betting event is a set in a tennis match.

8. The method of claim 1 wherein posted odds on a choice k at time t is calculated from all the bets placed up to time t, including house bets, and the ultimate payoff on a winning bet placed at time t is the same as the posted odds at time t, taking said bet into account.

9. The method of claim 1 wherein $p_t$ is estimated by a statistical analysis of results of similar situations in a historical sports database, where $p_r(t)$ is the fraction of times choice i was the winning choice in said similar situations.

10. The method of claim 1 wherein $p_t$ is estimated by a neural network trained on historical sports data.

11. A system for providing a betting game between a plurality of players, wherein said betting game is based on actions occurring during a live event, where said system is under the control of an administrator and comprises:
   a) a host processor programmed for analyzing and processing input data, and outputting data and information relevant to the betting game; said host processor programmed to:
      i) provide one or more selectable betting events to the players while the live event is in progress, wherein each betting event is based on actions occurring during said live event;
      ii) open one or more betting lines for each selected betting event before the start or after the start of the live event but before a termination event occurs with regard to the betting event, each betting line comprising two or more mutually exclusive betting choices corresponding to a finite set of possible outcomes of the selected betting event;
      iii) allow the players an amount of time before or during the betting event to selectively bet on the betting lines, and record the data associated with said bets in a BetLog, wherein the data associated with a bet is comprised of a time of the bet, the betting line and choice, the bet amount, and the bettor's identification;
      iv) at one or more time periods $\{t_0, t_1, \ldots, t_k\}$, place a house bet on one or more betting choices of a selected betting line, wherein each house bet is in an amount that is able to be the same or different from one another, where a first house bet is at time t_0 when the betting line opens, and wherein an artificial intelligence (AI) feed continuously estimates probabilities that each betting choice of each selected betting event will be a winning choice, $p_r = (p_r(1), \ldots, p_r(n))$, where n is a number of betting choices; and place additional one or more house bets at a time $\tau_{j+1}$, where the probabilities of the betting choices becoming the winning choice at times $\tau_j$ and $\tau_{j+1}$ differ from one another by more than a threshold c for the first time according to the formula: $\tau_{j+1} = \inf\{t > \tau_j : \|p_t - p_{\tau_j}\| > c\}$, where $\|\cdot\|$ is Euclidian distance, and wherein a house bet amount $\beta_r$ for each betting choice rat time $\tau_j$ is determined by the formula $\beta_r = b \cdot p_{r_j}(r)$, $r = 1, \ldots, n$, where b is the total amount bet, and wherein the amount of each house bet and the time of each house bet for the selected betting line are computed by the host computer;
   v) record data associated with house bets and player bets in the BetLog, wherein data associated with each house bet is comprised of the time of the bet, the betting line and choice, and player or house identification;
   vi) during the time when players are allowed to bet on the betting lines, continuously calculate estimated payoff odds based on the AI feed and the data in the BetLog at time t for choice j as determined by the formula $\Sigma m_r(t)/m_j(t) - 1$, where $m_r(t)$ is a total amount bet on choice r, starting from the previous house betting time up to time t, and electronically transmit said payoff odds to the plurality of players;
   vii) closing the one or more betting lines after an interval of time such that no further bets may be placed on the betting lines, wherein player bets and house bets are combined to form a total bet amount for each betting line;
   viii) monitor the live event until a termination event occurs with regard to the betting event;
   ix) terminate the betting event upon occurrence of the termination event; and
   x) upon termination of the betting event, pay winners of the one or more betting lines based on the total bet amount for each betting line and data in the BetLog, wherein the ultimate payoff odds on a winning bet placed for choice j at time t is given by the formula $\Sigma m_r(t_i)/m_j(t_i) - 1$, where $t_i$ is a next house betting time after t, or the termination time, whichever is smaller, and wherein winning house bets are paid to a house account;
b) a plurality of player processors interactively connected to said host processor, said player processor able to send and receive data to said host processor;
c) a display and interface device operatively associated with each said player processor, said display and interface device able to display data received from said player processor, and able to send betting instructions entered by the player to said host processor through said player processor;
d) an administrative processor interactively connected to said host processor, said administrative processor able to send commands to said host processor; and
e) an administrative display and interface device operatively associated with said administrative processor, said administrative display and interface device able to display data received from said host processor, and able to send commands entered by the administrator to said host processor;
wherein said commands control when said host processor opens and closes said betting line, and when said host processor terminates said betting line.

* * * * *